(12) United States Patent
Zhang

(10) Patent No.: US 8,960,580 B2
(45) Date of Patent: Feb. 24, 2015

(54) ELECTRIC GRINDER

(75) Inventor: Guoping Zhang, Ningbo (CN)

(73) Assignee: Ningbo Garron Housewares Co., Ltd., Ningbo (CN)

( * ) Notice: Subject to any disclaimer, the term of this patent is extended or adjusted under 35 U.S.C. 154(b) by 14 days.

(21) Appl. No.: 13/816,451

(22) PCT Filed: Aug. 18, 2011

(86) PCT No.: PCT/CN2011/001371
§ 371 (c)(1),
(2), (4) Date: Feb. 18, 2013

(87) PCT Pub. No.: WO2012/022118
PCT Pub. Date: Feb. 23, 2012

(65) Prior Publication Data
US 2013/0153698 A1    Jun. 20, 2013

(30) Foreign Application Priority Data

Aug. 19, 2010    (CN) ...................... 2010 2 0502114 U

(51) Int. Cl.
| | |
|---|---|
| A47J 42/00 | (2006.01) |
| A47J 42/06 | (2006.01) |
| A47J 42/08 | (2006.01) |
| A47J 42/40 | (2006.01) |
| A47J 42/46 | (2006.01) |

(52) U.S. Cl.
CPC ..... *A47J 42/06* (2013.01); *A47J 42/08* (2013.01); *A47J 42/40* (2013.01); *A47J 42/46* (2013.01)
USPC .......................................... 241/169.1; 241/258

(58) Field of Classification Search
USPC ................................................ 241/169.1, 258
See application file for complete search history.

(56) References Cited

U.S. PATENT DOCUMENTS

| | | | | |
|---|---|---|---|---|
| 6,966,507 | B2 * | 11/2005 | Yang | 241/100 |
| 7,198,214 | B1 * | 4/2007 | Bounds, III | 241/169.1 |
| 7,604,191 | B2 * | 10/2009 | Pai | 241/169.1 |
| 8,480,017 | B2 * | 7/2013 | Pai | 241/169.1 |
| 2002/0092941 | A1 * | 7/2002 | Henderson et al. | 241/169.1 |
| 2006/0261197 | A1 * | 11/2006 | Chan et al. | 241/169.1 |
| 2009/0121063 | A1 * | 5/2009 | Wu | 241/169.1 |

FOREIGN PATENT DOCUMENTS

JP     04135462 A  *  5/1992  ............. A23L 1/221

* cited by examiner

*Primary Examiner* — Faye Francis
(74) *Attorney, Agent, or Firm* — Wang Law Firm, Inc.; Li K. Wang; Stephen Hsu

(57) ABSTRACT

An electric grinder includes a bottle, a housing, a grinding assembly and a driving device mounted inside the housing, wherein, the housing detachably connected to the bottle, the grinding assembly has a female grinding head and a male grinding head, the driving device has an output engaged to a central driving rod, and the central driving rod passes through the grinding cavity and drives the male grinding head. As the constancy overall volume of the grinder, the storage amount of condiments is relatively larger, the electric grinder has well-arranged and aesthetically-designed components and is reliable in use, with uniform electric grinding and uniform discharging.

7 Claims, 6 Drawing Sheets

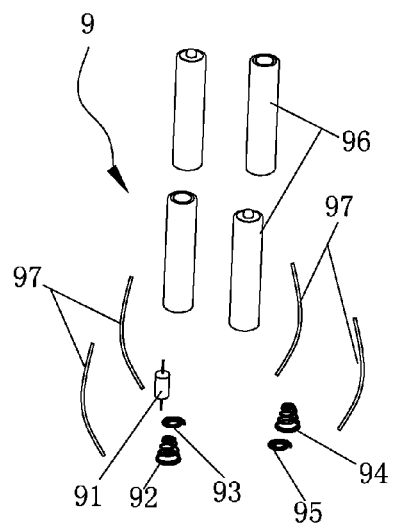
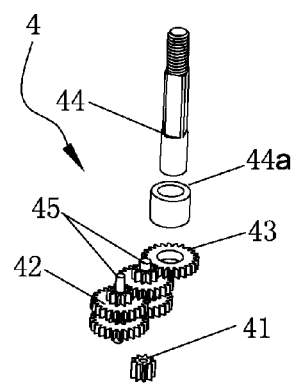
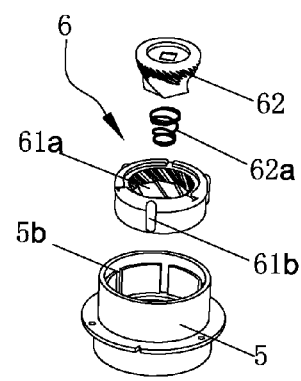
Fig. 3　　　　　Fig. 4　　　　　Fig. 5
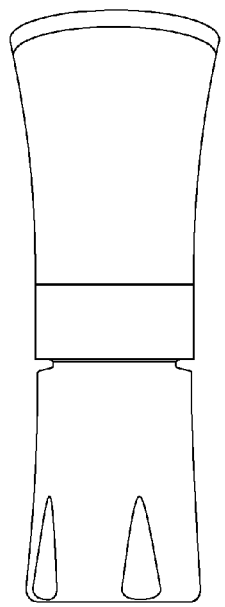
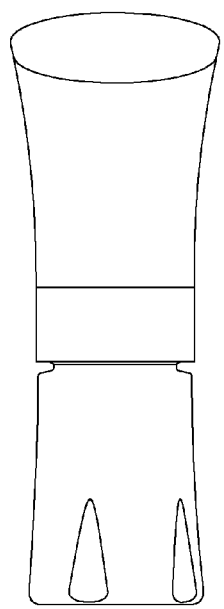
Fig. 6　　　　　Fig. 7

ELECTRIC GRINDER

RELATE APPLICATIONS

This application is a national phase entrance of and claims benefit to PCT Application for Electric Grinder thereof, PCT/CN2011/001371, filed on Aug. 18, 2011, which claims benefit to Chinese Patent Application 201020502114.3, filed on Aug. 19, 2010. The specifications of both applications are incorporated here by this reference.

FIELD OF THE INVENTION

The present invention relates to an electric grinder.

DESCRIPTION OF THE PRIOR ART

According to people's diet habits, various condiments, e.g. pepper, salt and cumin which are commonly used condiments, are usually added into the food during cooking or eating to improve the color, aroma and taste of the food. However, pepper and quite a few other condiments need to be ground into powder for eating as they are originally granular. As such, a grinder is needed. Existing household grinders are usually manually-operated and comprise a bottle for holding condiments, a grinding assembly and a driving device for driving the grinding assembly to operate, wherein the grinding assembly usually comprises a female grinding head and a male grinding head, the female grinding head has a circular shape with a center and a through hole in the center, the male grinding head is mounted in said through hole of the female grinding head, the external conic wall of the male grinding head and the inner conic wall of the through hole have matching grinding teeth, and a gap, for condiments passing through and grinding, between the male grinding head and the female grinding head and communicates with the inner cavity of the bottle. When in use, the bottle is tilted to enable granular condiments in the bottle to enter into the gap between the male grinding head and the female grinding head and then to be ground by the grinding assembly into powder that is scattered from the discharging opening of the gap. Ordinary grinders are all manually-operated to rotatably grind, with uneven rotation speed and less controllable discharging. Furthermore, they have to be operated by two hands, thus leading to a waste of both time and labor during in grinding.

On the other hand, as condiments are somewhat adhesive and easy to be adhered together, particularly in the highly moist environment or in the case of mutual pressing and stacking of the granular condiments, the space between the charging opening of the gap and the bottle may be adhered to and blocked by the condiments after long-term use, thus causing unsmooth charging. After a period of time, grinders have to be disassembled and cleaned, which results in the inconvenient use of grinders.

SUMMARY OF THE INVENTION

It is a first object of the present invention to provide an electric grinder that is sanitary and safe, reliable in use and uniform in discharging. The electric grinder has well-arranged and aesthetically-designed components and a large capacity for condiments, thus being quite practical.

It is a second object of the present invention to provide an electric grinder, which can effectively prevent the charging opening of the grinder assembly from being blocked by condiments so as to ensure smooth charging and discharging.

For achieving the above stated first object, the electric grinder comprises:

a bottle for holding condiments to be ground;

a housing detachably connected to the bottle;

a grinding assembly mounted inside the housing for grinding the condiments; wherein, the grinding assembly comprises a female grinding head and a male grinding head, the female grinding head has a circular shape with a center and a grinding cavity in the center, the male grinding head is mounted in the grinding cavity of the female grinding head, and a grinding gap is formed between the female grinding head and the male grinding head and communicates with the bottle, the male grinding head has an external conic wall and the grinding cavity has an internal conic wall, the external conic wall and the internal conic wall have matching grinding teeth;

wherein, the electric grinder further comprises a driving device mounted inside the housing to drive the grinding assembly; the driving device and the grinding assembly are both located above the bottle, the driving device has an output engaged to a central driving rod, and the central driving rod passes through the grinding cavity and drives the male grinding head.

Preferably, the housing has a seat with a bottom for receiving the driving device, and the seat has a passage for connecting the grinding gap to the bottle.

Preferably, a guiding plate, connected to the seat and forming a passage for the condiments, for separating the driving device from the condiments passing through the passage, which can prevent the condiments from entering into the driving device so as to ensure the obtaining of sanitary and safe food.

Preferably, the housing further comprises a lower sleeve and an upper sleeve mounted on top of the lower sleeve, and the bottom of the seat is placed in the lower sleeve.

Preferably, a grinding base with a through hole mounted on top of the seat and a cover plate with a plurality of discharging openings mounted inside the housing and above the grinding base, wherein the female grinding head is placed inside the through hole of the grinding base.

For further achieving the above stated second object, preferably, the central driving rod connects to a sweeping wheel located beneath the grinding assembly, and the sweeping wheel has a plurality of radially-distributed driving levers. When the sweeping wheel rotates along with the central driving rod, the driving levers thereof can continuously stir the condiments stagnated beneath the grinding assembly so as to effectively prevent the condiments from adhering together beneath the gap between the female grinding head and the male grinding head, thus preventing the blockage of charging.

Preferably, the driving device comprises a motor, a power supply and a gear set engaged with the output of the motor, and the gear set has a driving gear connected to the central driving rod.

Preferably, a pressure buffer spring, with two ends resisting against the male grinding head and the seat, through which the central driving rod passes and an adjusting knob mounted on top of the central driving rod for pressing the male grinding head. The rotation of the adjusting knob can adjust the upward and downward movement positions of the male grinding head on the central driving rod so as to further adjust the grinding gap between the male grinding head and the female grinding head for the grinding fineness.

Preferably, the housing has a top and a cap is attached to the top of the housing, a pair of magnets is mounted on the top of the adjusting knob and the inner of the cap.

For achieving both of the first object and second object, an electric grinder comprises a housing with a lower sleeve and an upper sleeve, the upper sleeve being mounted on top of the lower sleeve; a grinding head assembly mounted in the housing for grinding condiments; a seat, having a top, placed inside the lower sleeve; an upper base connected to the top the seat; a grinding base mounted on the top of the seat; a motor placed inside the seat; a transmitting device connected to the motor; wherein the grinding head assembly is mounted inside the grinding base, and the grinding head assembly is driven by the motor to grind the condiments; a guiding plate connected to the seat for guiding the condiments; and a sweeping wheel rotatably mounted above the upper base for maintaining flow of the condiments through the grinding head assembly.

As a preference, the specific improvement is as follows:

A control circuit system connected to the motor, the control circuit system has a rolling ball switch, a first electric spring, a first electric spring leaf, a second electric spring, a second electric spring leaf and batteries, which are connected in series via wires.

An output shaft connected to the motor, wherein the transmitting device comprises a master gear connected to the output shaft of the motor, an intermediate gear set connected to the master gear and a driving gear which is connected to a central driving rod.

The intermediate gear set is mounted on a gear base via a gear shaft, the gear base is fixed to the seat via a plurality of bolts, and the intermediate gear set connects to the master gear and the driving gear.

The grinding head assembly comprises a female grinding head with a grinding cavity and a periphery and a plurality of protruded strips formed on the periphery and a male grinding head rotatably mounted inside the grinding cavity of the female grinding head, the grinding base has an inner surface with a plurality of sliding grooves, and each protruded strip can slide into a sliding groove when the female grinding head is mounted on the grinding base.

The central driving rod passes through a central hole on the upper base and rotatably engages the upper base via a shaft sleeve, both the sweeping wheel and the male grinding head are mounted on the central driving rod.

The sweeping wheel is mounted on a spring, and the male grinding head is mounted on a pressure buffer spring.

A cover plate with a discharging opening on top of the grinding base, an adjusting knob, connected to the central driving rod and pressed against the male grinding head, for adjusting a grinding gap between the female grinding head and the male grinding head.

A cap covering a discharging opening of the housing, and the discharging opening of the housing is in communication with a bottle.

The bottle is screwed on the seat.

Compared with the prior art, in the invention, the electric driving device and the grinding assembly is designed to be above the bottle, which can separate condiments from electric components strictly, it ensures foods to be sanitary and safe; as the constancy overall volume of the grinder, the storage amount of condiments is relatively larger, contributing to the great practicality of the grinder; furthermore, the electric grinder has well-arranged and aesthetically-designed components and is reliable in use, with uniform electric grinding and uniform discharging.

Meanwhile, the arrangement of the sweeping wheel beneath the grinding assembly can effectively prevent condiment blockage at the charging opening of the grinding assembly and ensure smooth charging and discharging.

And the grinder may be operated for grinding with one hand by opening or closing the rolling ball switch, in this way, both time and labor are saved, and it is convenient and simple to operate; and, the electric grinder also has the advantages of uniform discharging, safe and sanitary discharges, novel structure, and the like.

BRIEF DESCRIPTION OF THE DRAWINGS

FIG. 3 is an exploded perspective view of a control circuit system in FIG. 2.

FIG. 4 is an exploded perspective view of the driving device in FIG. 2.

FIG. 5 is an exploded perspective view of a grinding assembly in FIG. 1.

FIG. 6 is a right side view of the electric grinder in FIG. 1.

FIG. 7 is a left side view of the electric grinder in FIG. 1.

DETAILED DESCRIPTION OF THE PREFERRED EMBODIMENT

Figure 1:
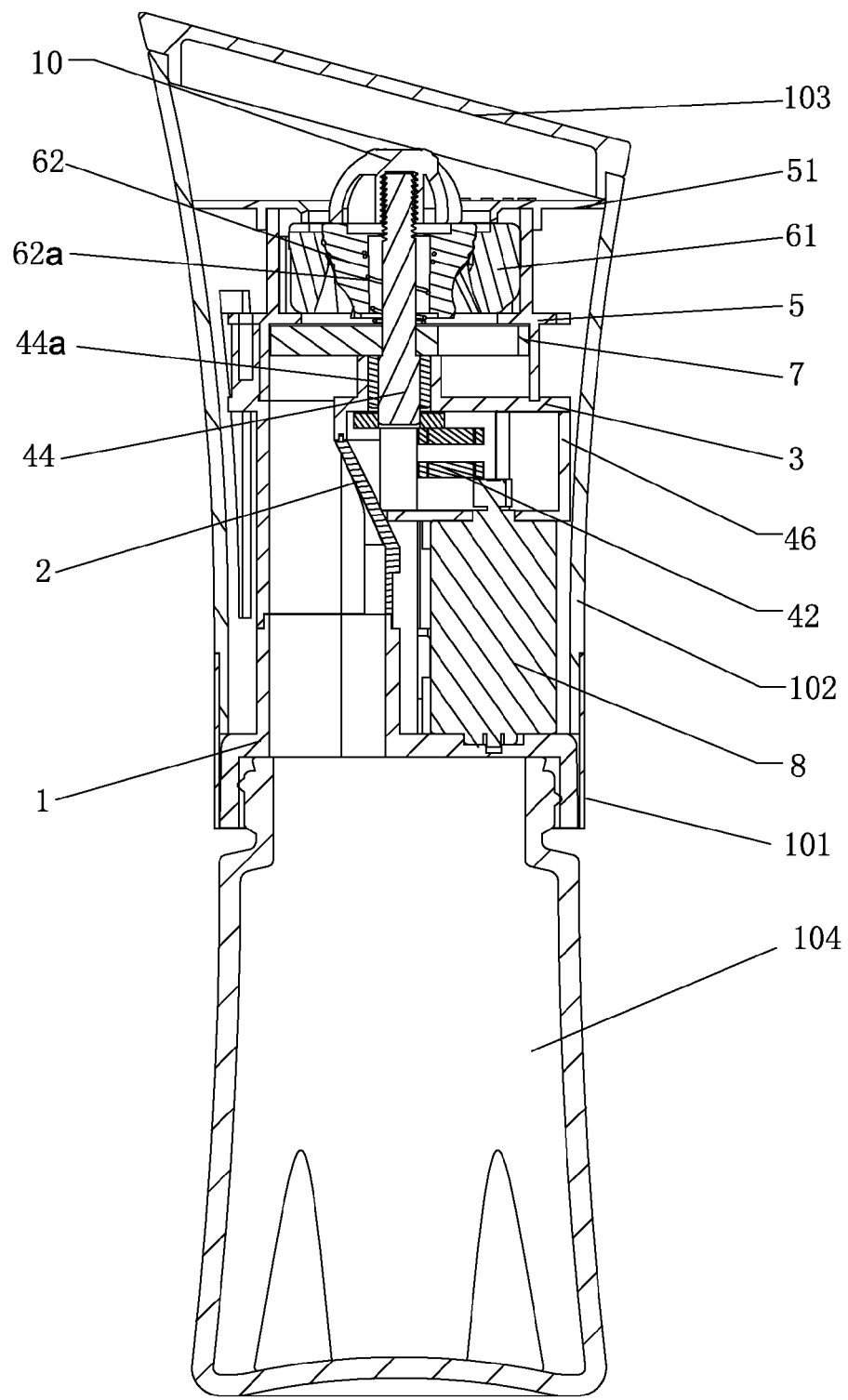
FIG. 1 is a sectional view of an electric grinder in accordance with a first embodiment of the present invention.

To enable a further understanding of the innovative and technological content of the invention herein, refer to the detailed description of the invention and the accompanying drawings below:

FIG. 1 to FIG. 7 are perspective views of an electric grinder in accordance with a first embodiment of the present invention.

In the figures, the reference numbers and the corresponding components are as follows: seat 1, guiding plate 2, upper base 3, driving device 4, master gear 41, intermediate gear set 42, driving gear 43, central driving rod 44, shaft sleeve 44a, gear shaft 45, gear base 46, grinding base 5, sliding groove 5b, cover plate 51, discharging opening 51a, grinding head assembly 6, female grinding head 61, grinding cavity 61a, protruded strip 61b, male grinding head 62, pressure buffer spring 62a, sweeping wheel 7, spring 71, motor 8, control circuit system 9, rolling ball switch 91, first electric spring 92, first electric spring leaf 93, second electric spring 94, second electric spring leaf 95, batteries 96, wires 97, adjusting knob 10, lower sleeve 101, upper sleeve 102, cap 103, bottle 104.

As shown in FIG. 1 to FIG. 7, an electric grinder comprises a housing, a grinding head assembly 6, a seat 1, an upper base 3, a grinding base 5, a motor 8 placed inside the seat 1 having a top, a transmitting device 4, a guiding plate 2, and a sweeping wheel 7. The housing is composed of a lower sleeve 101 and an upper sleeve 102, the upper sleeve 102 being mounted on top of the lower sleeve 101. The grinding head assembly 6 is mounted in the housing for grinding condiments. The seat 1 is placed inside the lower sleeve 101. The upper base 3 is connected to the top the seat 1. The grinding base 5 is mounted on the top of the seat 1. The transmitting device 4 is connected to the motor 8. The grinding head assembly 6 is mounted inside the grinding base 5, and the grinding head assembly 6 is driven by the motor 8 to grind the condiments.

The guiding plate 2 is connected to the seat 1 for guiding the condiments. And the sweeping wheel 7 is rotatably mounted above the upper base 3 for maintaining flow of the condiments through the grinding head assembly 6. In the invention, as the guiding plate 2 and the sweeping wheel 7 are provided, respectively, taint of odor and condiment blockage can be avoided during grinding of different condiments. The employment of electric grinding via a motor can not only lead to the effects of quick grinding speed and uniform discharging, but also save time and labor.

Figure 2:
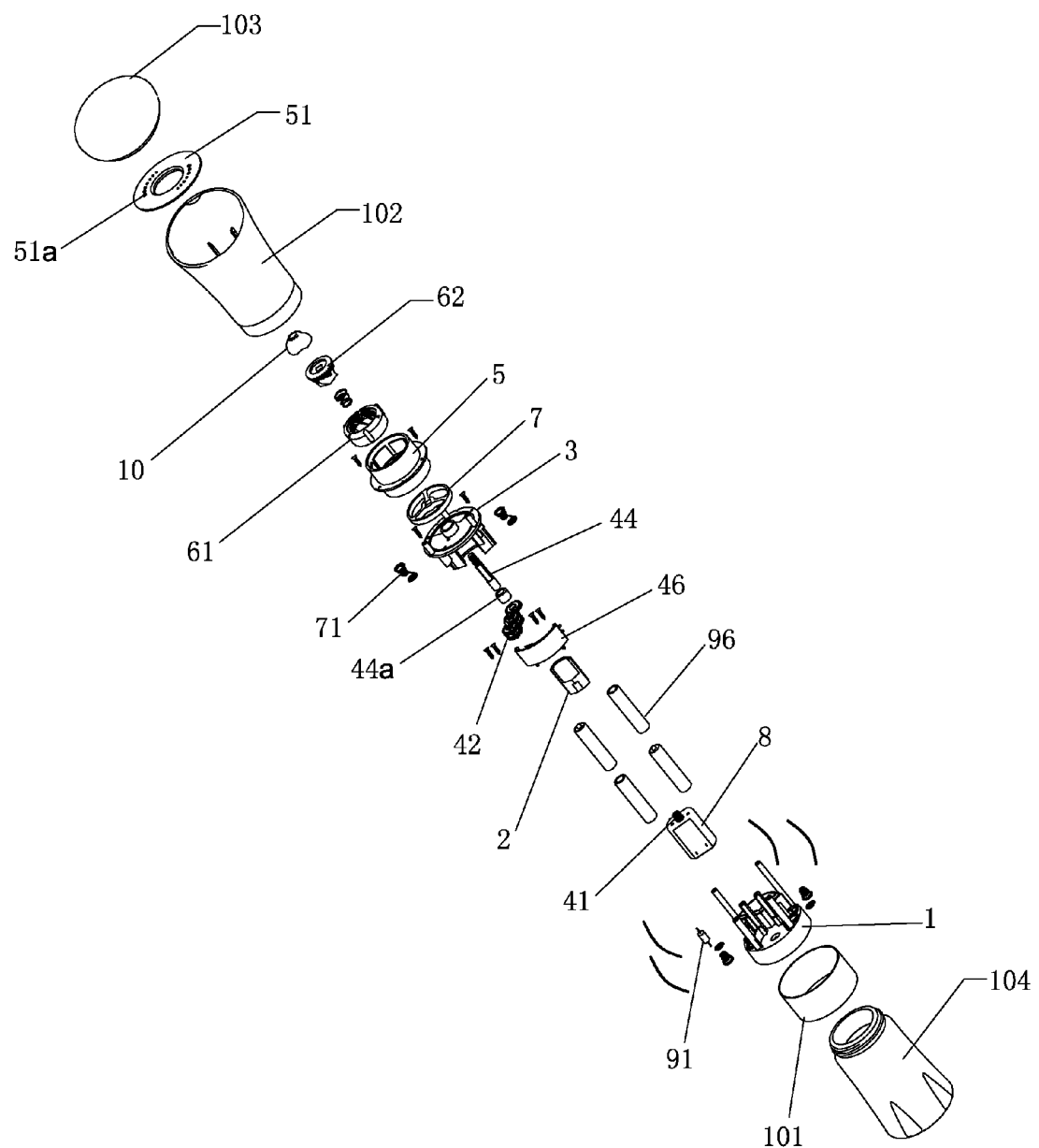
FIG. 2 is an exploded perspective view of the electric grinder in FIG. 1.

As shown in FIG. 2 and FIG. 3, a control circuit system 9 is connected to the motor 8, the control circuit system 9 has a rolling ball switch 91, a first electric spring 92, a first electric spring leaf 93, a second electric spring 94, a second electric spring leaf 95 and batteries 96, which are connected in series via wires 97. The rolling ball switch 91 is mounted on the housing via wires so that it can be operated by one hand to control the ON or OFF of the motor 8 for grinding.

As shown in FIG. 2 and FIG. 4, an output shaft is connected to the motor 8, wherein the transmitting device 4 comprises a master gear 41 connected to the output shaft of the motor 8 an intermediate gear set 42 connected to the master gear 41 and a driving gear 43 which is connected to a central driving rod 44. The intermediate gear set 42 is mounted on a gear base 46 via a gear shaft 45, the gear base 46 is fixed to the seat 1 via a plurality of bolts, and the intermediate gear set 42 connects to the master gear 41 and the driving gear 43.

As shown in FIG. 2 and FIG. 5, the intermediate gear set 42 is mounted on a gear base 46 via a gear shaft 45, the gear base 46 is fixed to the seat 1 via a plurality of bolts, and the intermediate gear set 42 connects to the master gear 41 and the driving gear 43. It is convenient and simple for installing and is easy to disassemble by the mean of clamping.

The central driving rod 44 passes through a central hole on the upper base 3 and rotatably engages the upper base via a shaft sleeve 44a, both the sweeping wheel 7 and the male grinding head 62 are mounted on the central driving rod 44. The sweeping wheel 7 is mounted on a spring 71, and the male grinding head 62 is mounted on a pressure buffer spring 62a.

As shown in FIG. 2, a cover plate 51 with a discharging opening 51a on top of the grinding base 5, an adjusting knob 10, connected to the central driving rod 44 and pressed against the male grinding head 62, is used for adjusting a grinding gap G between the female grinding head 61 and the male grinding head 62. A cap 103 covering a discharging opening of the housing, the bottle 104 is screwed on the seat 1.

The electric grinder in the first embodiment of the invention is assembled in according to the following steps: Step 1, connecting the wires with the first electric spring 92, the second electric spring leaf 95 and the rolling ball switch 91 respectively and then mounting them on the seat 1 by means of soldering; Step 2, connecting the wires with the bipolar terminal studs of the motor 8, the second electric spring 94 and the first electric spring leaf 93 respectively and then mounting them on the seat 1 again; Step 3, tightly mounting the master gear 41 on the shaft of the motor 8; Step 4, connecting the guiding plate 2 to the seat 1; Step 5, fixing the gear base 46 on the seat 1 via screws; Step 6, mounting the intermediate gear set 42 on the gear shaft 45 and then mounting them together on the gear base 46; Step 7, sleeving the shaft sleeve 44a on the central driving rod 44 and then mounting them together on the driving gear 43; Step 8, fixing the upper base 3 on the seat 1 via screws; Step 9, connecting two springs 71 to the upper base 3; Step 10, sleeving the sweeping wheel 7 on the central driving rod 441; Step 11, fixing the grinding base 5 on the upper base 3 via screws; Step 12, mounting the female grinding head 62 in the grinding base 5; Step 13, sleeving the pressure buffer spring 62a and the male grinding head 62 on the central driving rod 44, and then screwing the adjusting knob 10; Step 14, mounting batteries 96 in the assembly obtained through the above steps; Step 15, sleeving the upper sleeve 102 on the assembly obtained through the above steps, mounting the cover plate 51, and covering the cap 103; Step 16, sleeving the lower sleeve 101 on the upper sleeve 102 in the assembly; and Step 17, screwing the bottle 104 on the seat 1 of the assembly. The assembly process is finished.

Figure 8:
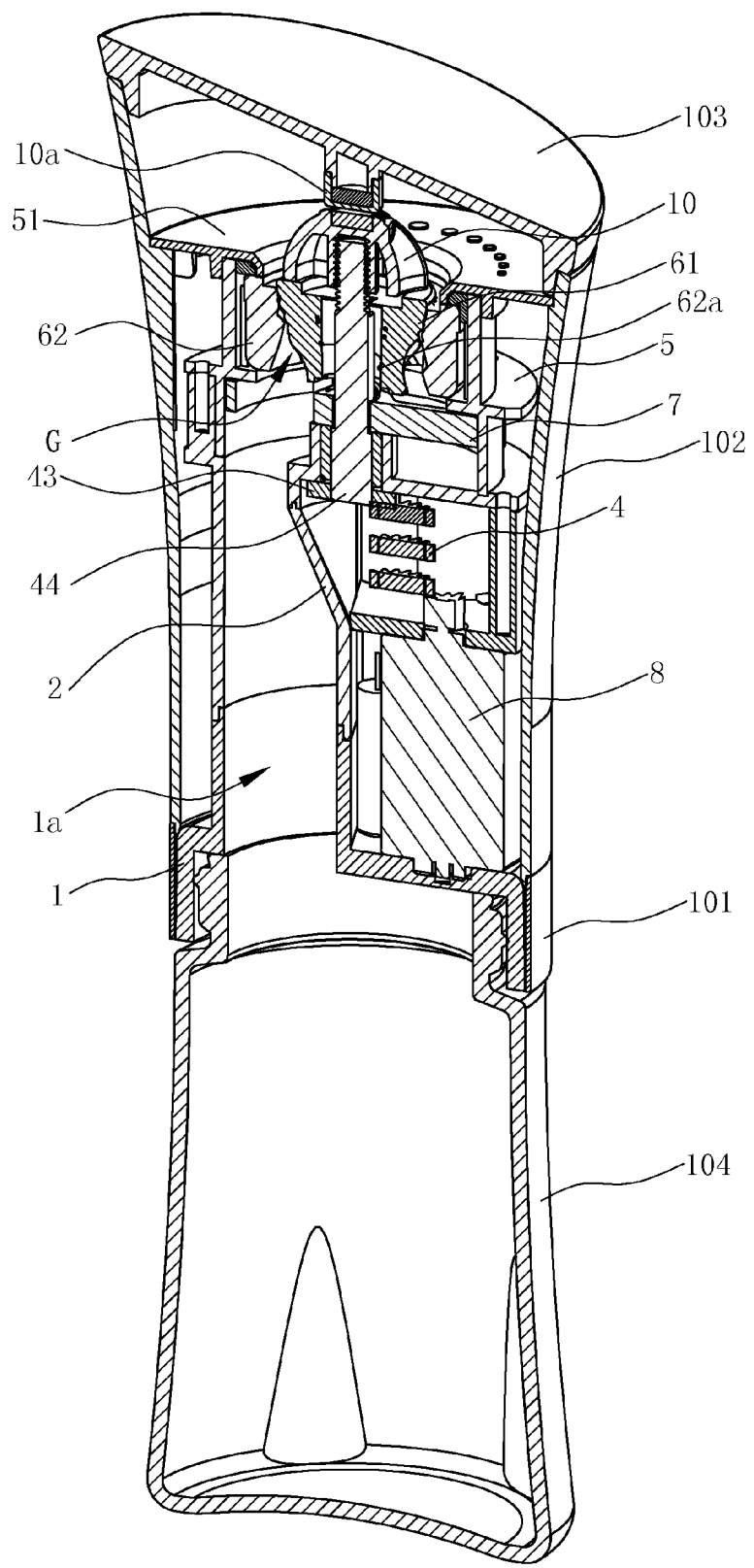
FIG. 8 is a sectional view of the electric grinder in accordance with a second embodiment of the present invention.
Figure 9:
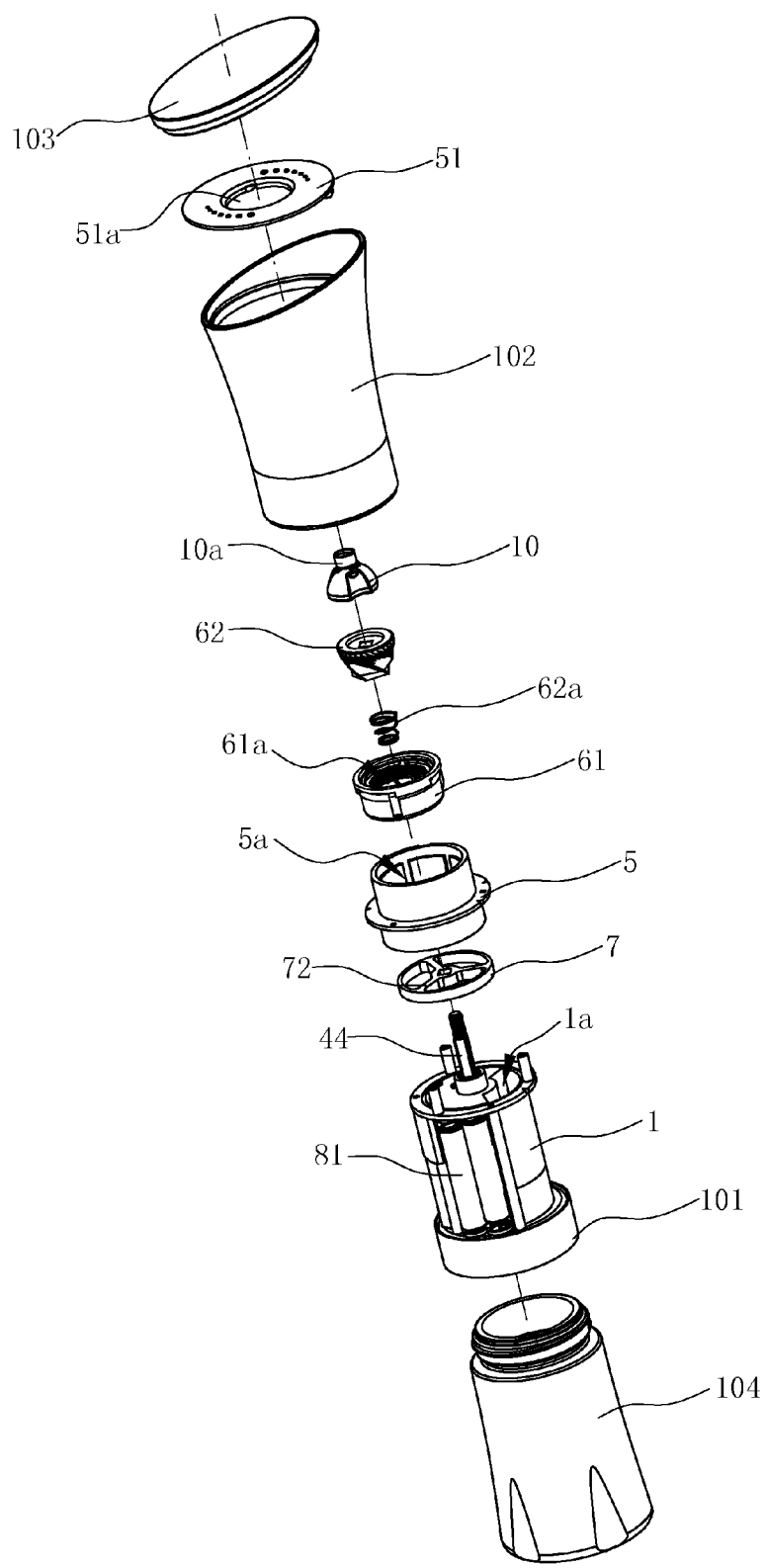
FIG. 9 is an exploded perspective view of the electric grinder in accordance with the second embodiment of the present invention.
Figure 10:
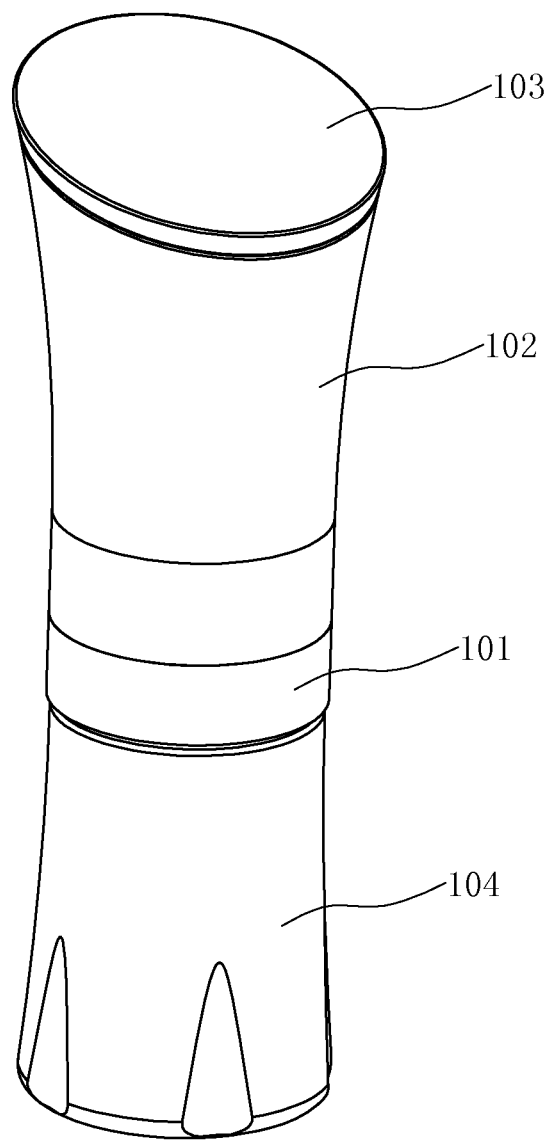
FIG. 10 is a perspective view of the whole electric grinder in accordance with the second embodiment of the present invention.

FIG. 8, FIG. 9 and FIG. 10 are perspective views in accordance with a second embodiment of the present invention.

In this embodiment, the electric grinder comprises a bottle 104, a housing located above the bottle 104, a grinding assembly and a driving device mounted inside the housing, that is, the grinding assembly and the driving device are located above the bottle 104.

The bottle 104 is used for holding condiments to be ground.

The grinding assembly is located above the driving device for grinding the condiments. The grinding assembly comprises a female grinding head 61 and a male grinding head 62, the female grinding head 61 has a circular shape with a center and a grinding cavity 61a in the center, the male grinding head 62 is mounted in the grinding cavity 61a of the female grinding head 61, and a grinding gap G is formed between the female grinding head 61 and the male grinding head 62, furthermore, the male grinding head 62 has an external conic wall and the grinding cavity has an internal conic wall, the external conic wall and the internal conic wall have matching grinding teeth.

The housing is composed of a lower sleeve 101 and an upper sleeve 102 mounted on top of the lower sleeve 101, the lower sleeve 101 detachably connected to the top of the bottle 104 via threads. The housing has a seat 1 in frame structure, the bottom of the seat 1 is placed in the lower sleeve 101, and the seat has a passage 1a for connecting the grinding gap G to the bottle 104. Moreover, a guiding plate 2, which is connected to the seat 1 and forms a passage 1a for the condiments, for separating the driving device from the condiments passing through the passage 1a. In the embodiment, the guiding plate 2 has an inclined transition face, which ensures that granular condiments can enter into the grinding gap G smoothly.

A grinding base 5 with a through hole 5a is mounted on top of the seat 1 and a cover plate 51 with a plurality of discharging openings 51a mounted inside the upper sleeve 102 and above the grinding base 5, wherein the female grinding head 61 is placed inside the through hole 5a of the grinding base 5, and, the top of the upper sleeve 102 is covered by a cap 103.

The driving device is mounted inside the seat 1 for driving the grinding assembly to operate. The driving device comprises a motor 8, a power supply 81 and a gear set 4 engaged with the output of the motor 8 and the gear set 4 has a driving gear 43 connected to the central driving rod 44. The central driving rod 44 passes through the grinding cavity 61a and drives the male grinding head 62, that is, when in operation, the male grinding head 62 continuously rotates along with the central driving rod 44, while the female grinding head 61 is dormant relative to the housing and the seat 1.

Furthermore, the central driving rod 44 connects to a sweeping wheel 7 located beneath the grinding assembly, and the sweeping wheel 7 has a plurality of radially-distributed driving levers 72. In the embodiment, the quantity of driving levers 72 is three.

A pressure buffer spring 62a, with two ends resisting against the bottom of the male grinding head 62 and the top surface of sweeping wheel 7, moreover, an adjusting knob 10 mounted on top of the central driving rod 44 for pressing the male grinding head 62. In this embodiment, an operating portion 10*a* is further mounted on the top of the adjusting knob 10 for operating by fingers, and a pair of magnets is mounted on the top of the adjusting knob 10 and the inner of the cap 103, which is convenient for positioning when the cover is in coverage.

The invention claimed is:

1. An electric grinder comprising:
a bottle for holding condiments to be ground;
a housing detachably connected to the bottle;
a grinding assembly mounted inside the housing for grinding the condiments;
a driving device mounted inside the housing to drive the grinding assembly;
a grinding base;
wherein, the grinding assembly comprises a female grinding head and a male grinding head, the female grinding head has a circular shape with a center and a grinding cavity in the center, the male grinding head is mounted in the grinding cavity of the female grinding head, and a grinding gap is formed between the female grinding head and the male grinding head and communicates with the bottle, the male grinding head has an external conic wall and the grinding cavity has an internal conic wall, the external conic wall and the internal conic wall have matching grinding teeth;
the housing has a seat with a bottom for receiving the driving device, and the seat has a passage for connecting the grinding gap to the bottle;
the grinding base has a through hole mounted on top of the seat and a cover plate with a plurality of discharging openings mounted inside the housing and above the grinding base, wherein the female grinding head is placed inside the through hole of the grinding base;
the driving device is located above the bottle and the grinding assembly is located above the driving device, the driving device has an output engaged to a central driving rod, and the central driving rod passes through the grinding cavity and drives the male grinding head.

2. The electric grinder of claim 1, further comprising a guiding plate, connected to the seat and forming a passage for the condiments, for separating the driving device from the condiments passing through the passage.

3. The electric grinder of claim 1, wherein the housing further comprises a lower sleeve and an upper sleeve mounted on top of the lower sleeve, and the bottom of the seat is placed in the lower sleeve.

4. The electric grinder of claim 1, wherein the central driving rod connects to a sweeping wheel located beneath the grinding assembly, and the sweeping wheel has a plurality of radially-distributed driving levers.

5. The electric grinder of claim 1, wherein the driving device comprises a motor, a power supply and a gear set engaged with the output of the motor, and the gear set has a driving gear connected to the central driving rod.

6. The electric grinder of claim 1, further comprising a pressure buffer spring, with two ends resisting against the male grinding head and the seat, through which the central driving rod passes and an adjusting knob mounted on top of the central driving rod for pressing the male grinding head.

7. The electric grinder of claim 6, wherein the housing has a top and a cap is attached to the top of the housing.

\* \* \* \* \*